United States Patent [19]

McCabe et al.

[11] Patent Number: 4,673,556

[45] Date of Patent: Jun. 16, 1987

[54] METHOD OF SIMULTANEOUS OXIDATION OF CARBON MONOXIDE AND UNBURNED FUEL IN METHANOL VEHICLE EXHAUST

[75] Inventors: Robert W. McCabe, Lathrup Village; Patricia J. Mitchell, Troy, both of Mich.

[73] Assignee: General Motors Corporation, Detroit, Mich.

[21] Appl. No.: 796,107

[22] Filed: Nov. 8, 1985

[51] Int. Cl.$^4$ ............................................. B01D 53/36
[52] U.S. Cl. .................................. 423/213.5; 423/245
[58] Field of Search .................. 423/213.5, 245 S, 247

[56] References Cited

U.S. PATENT DOCUMENTS 3,053,612  9/1962  Rosset .............................. 423/213.5
4,304,761  12/1981  Yu Yao ............................. 423/213.2

FOREIGN PATENT DOCUMENTS 1024518  3/1966  United Kingdom ............. 423/213.5

OTHER PUBLICATIONS

Acta Chimica Sinica 42, 1133–1138 (1984) (w/translation).

Primary Examiner—John Doll
Assistant Examiner—Jeffrey Edwin Russel
Attorney, Agent, or Firm—R. W. Tung

[57] ABSTRACT

A method of treating exhaust gases from an internal combustion engine burning methanol fuel by simultaneously oxidizing the unburned methanol and carbon monoxide at low conversion temperatures by passing the exhaust gases over a catalyst system consisting essentially of silver and palladium dispersed on gamma alumina.

1 Claim, 4 Drawing Figures

METHOD OF SIMULTANEOUS OXIDATION OF CARBON MONOXIDE AND UNBURNED FUEL IN METHANOL VEHICLE EXHAUST

FIELD OF THE INVENTION

The present invention generally relates to a method of treating exhaust gases from an internal combustion engine burning methanol fuel by simultaneously oxidizing the unburned methanol and carbon monoxide into carbon dioxide and water and, more particularly, is concerned with a method of treating exhaust gases from an internal combustion engine burning methanol fuel by simultaneously oxidizing the unburned methanol and carbon monoxide by passing the exhaust gases over a catalyst system consisting essentially of silver and palladium dispersed on gamma alumina.

BACKGROUND OF THE INVENTION

Vehicles that operate on methanol fuel must meet governmental emission standards for nitrogen oxides, hydrocarbons, and carbon monoxide. Because of the lean-burn characteristics of methanol vehicles, the nitrogen oxide standards may be met without the use of catalytic converters. However, converters must be used to treat the exhaust gases in order to meet the carbon monoxide and hydrocarbon emission standards. Hydrocarbon emissions from methanol fueled vehicles are largely oxygenated organic compounds, of which unburned methanol is the principal component.

Efforts have been made by others to treat exhaust gases from a methanol fueled internal combustion engine. For instance, U.S. Pat. No. 4,304,761 issued to Yu Yao disclosed a method of oxidizing unburned methanol by passing the exhaust gases over a silver catalyst. Yu Yao disclosed that silver has a relatively low reaction temperature for a high percentage conversion of methanol to $CO_2$ while producing no significant amount of undesirable byproducts such as formaldehyde. Yu Yao also disclosed that while platinum and palladium are active at low temperatures for converting unburned methanol, both platinum and palladium have an affinity for producing aldehydes.

The object of our invention is to simultaneously oxidize unburned methanol and carbon monoxide contained in methanol vehicle exhaust. It is known in catalysis that difficulties are frequently encountered when simultaneous chemical reactions are desired since certain chemical compounds can inhibit the reactions of other compounds. In an application such as automotive exhaust catalysis, a number of simultaneous chemical reactions must be accomplished at the same time, e.g., the oxidation of hydrocarbons, the oxidation of carbon monoxide, the reduction of nitric oxides, etc. Therefore, the inhibiting effects of the various species on the reactions of other species must be taken into consideration in such complex reactions.

We have discovered that the inhibiting effects of various species exist in the simultaneous oxidations of unburned methanol and carbon monoxide in methanol fueled vehicle exhaust. Specifically, carbon monoxide is adsorbed rapidly and strongly on a noble metal catalyst such as palladium at low temperatures thereby preventing the adsorption and reaction of unburned methanol. As a result, rapid oxidation of methanol can only be achieved at temperatures that are high enough to remove the carbon monoxide either by desorption or by reaction with oxygen.

It is therefore an object of the present invention to provide a method of treating exhaust gases from an internal combustion engine burning methanol fuel by simultaneously oxidizing the unburned methanol and carbon monoxide contained in such exhaust gases.

It is another object of the present invention to provide a method to efficiently treat exhaust gases from an internal combustion engine burning methanol fuel by simultaneously oxidizing the unburned methanol and carbon monoxide contained in such exhaust gases at low conversion temperatures.

SUMMARY OF THE INVENTION

Our novel invention is a method of treating exhaust gases from an internal combustion engine burning methanol fuel by simultaneously oxidizing the unburned methanol and carbon monoxide by passing the exhaust gases over a bimetallic catalyst system consisting essentially of silver and palladium. Our novel catalyst system contains palladium and silver atoms finely dispersed on a porous gamma alumina support. Some of the novel features of our invention are explained as follows. First, the atomic ratio of silver to palladium used in our bimetallic catalyst system is very large, i.e., normally larger than 100:1. For instance, in a preferred embodiment of our invention, a silver to palladium ratio of 500:1 was used.

Secondly, a specific preparation method was designed to prepare our catalyst system such that the small amount of palladium atoms are finely dispersed on the silver atoms. We have discovered that in order for the bimetallic catalyst system to be effective, the small number of palladium atoms must be placed in intimate contact with large numbers of silver atoms. These two requirements are crucial to the successful practice of our invention. They must both be met before unburned methanol and carbon monoxide can be effectively oxidized to carbon dioxide and water at relatively low conversion temperatures.

BRIEF DESCRIPTION OF THE DRAWINGS

Other objects, features and advantages of the present invention will become apparent upon consideration of the specification and the appended drawings in which.

DESCRIPTION OF THE PREFERRED EMBODIMENT

Figure 1:
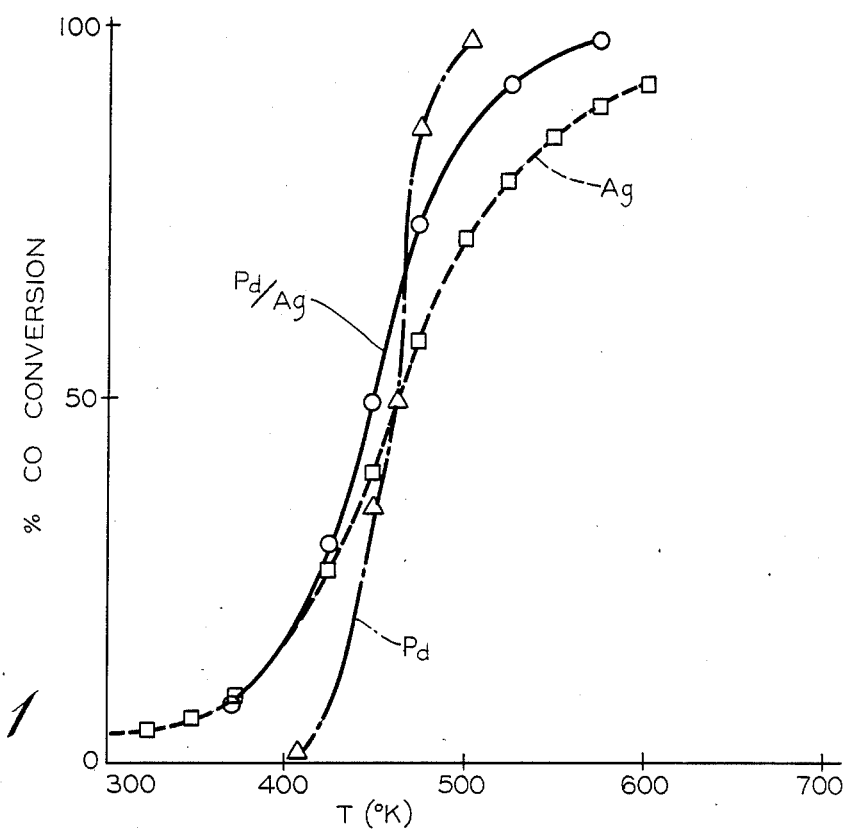
FIG. 1 is a graph showing the carbon monoxide oxidation activities of three gamma alumina-supported catalyst systems: silver alone, palladium alone, and the silver/palladium bimetallic catalyst system.

In our initial work of methanol oxidation studies, we have discovered that noble metal such as palladium is most active in converting methanol. For instance, in a standard 0.2% methanol/1% oxygen/balance helium feed, the palladium catalyst converts most of the feed methanol when the room temperature feed is flowed over the catalyst. However, we have also discovered that when palladium catalyst is used, undesirable by-products of methanol partial oxidation such as formaldehyde and methyl formate are produced. Moreover, we have discovered that when carbon monoxide is added to the methanol/oxygen feed to simulate a methanol fueled vehicle exhaust, the methanol oxidation activities of the palladium catalyst is strongly inhibited. We thus have a need to design a catalyst system which is selective for oxidizing methanol to carbon dioxide and water in the presence of carbon monoxide at low conversion temperatures.

In contrast to the noble metal catalysts, the methanol oxidation activity of a silver/gamma alumina catalyst is virtually unaffected by the presence of carbon monoxide in the feed. Although the silver catalyst is less active for methanol oxidation than the palladium catalyst in the absence of carbon monoxide, it is more active for methanol oxidation in the presence of carbon monoxide. We have also discovered that only a very small amount of formaldehyde was formed during methanol oxidation over the silver catalyst. Although silver catalysts have poor carbon monoxide oxidation activity, our initial results indicate that a palladium/silver bimetallic catalyst system may be ideal for the simultaneous oxidation of carbon monoxide and methanol. In such a bimetallic system, palladium will be combined with silver to produce a catalyst with superior carbon monoxide and methanol oxidation activities to those demonstrated by either silver or palladium alone.

Another benefit of our bimetallic catalyst system containing silver and palladium is that better carbon monoxide oxidation activity than either silver catalyst or palladium catalyst alone may be obtained. Even though the exact reaction mechanism is not known, we believe that the carbon monoxide oxidation activities of the noble metal catalyst is suppressed at low temperatures by the carbon monoxide inhibition of oxygen adsorption. Silver, however, can readily adsorb oxygen even in the presence of carbon monoxide. Therefore, in a bimetallic catalyst system containing highly dispersed palladium atoms on silver atoms and when they are in intimate contact, the noble metal would function to adsorb carbon monoxide and the silver would function to dissociatively adsorb oxygen. This result of enhanced carbon monoxide oxidation activity is achieved through the carbon monoxide adsorption on palladium which is then reacted rapidly with oxygen atoms adsorbed on silver located in close proximity.

We have therefore concluded that in order to simultaneously oxidize unburned methanol and carbon monoxide contained in a methanol fueled vehicle exhaust, two requirements must be satisfied. First, the atomic ratio between silver and palladium must be sufficiently high, i.e., larger than 100:1. We have discovered a suitable ratio of silver:palladium to be used is 500:1. The second requirement is that in order to simultaneously oxidize methanol and carbon monoxide, the palladium atoms must be finely dispersed in silver atoms resulting in a close proximity to the silver atoms. In other words, no aggregated palladium particle (i.e., 20 Angstrom or more) is allowed to form such that the chemical reactions which produce undesirable partial oxidation byproducts such as formaldehyde and methyl formate by large palladium particles may be avoided. This state of palladium and silver atoms in intimate contact can only be achieved by our special preparation method which shall be described as follows.

Low density high surface area gamma-alumina pellets are used as the dispersing support. We have found suitable gamma-alumina pellets to be used are supplied by W. R. Grace Company. These pellets have an average diameter of ⅛ inch and an average surface area of 110 meter$^2$/gram. The catalyst is prepared by sequential impregnation of first silver nitrate (AgNO$_3$) aqueous solution, then followed by a palladium tetrammine salt aqueous solution. The incipient wetness impregnation technique is used wherein minimum amounts of aqueous salt solution are used to cover the alumina pellets. By using our sequential impregnation technique, the alumina pellets are first impregnated with the silver nitrate solution, and then dried and calcined in forced hot air. The same procedure of impregnation, drying, and calcining is followed for the palladium tetrammine solution. In our process, the silver undergoes two calcination steps and the palladium one calcination step prior to obtaining the finished catalyst. The silver nitrate we used is ACS certified crystal supplied by Fisher Chemical. The palladium tetrammine salt we used is a palladium tetrammine dinitrate (Pd(NH$_3$)$_4$(NO$_3$)$_2$) with a 95–99% purity, commercially available from K and K Fine Chemicals.

EXAMPLE

The preparation of our novel catalyst system in a 350 gm batch (700 cm$^3$ in volume) of 0.01 wt % Pd-5 wt % Ag/gamma Al$_2$O$_3$ can be carried out by the following steps:

1. dissolve 27.6 gm Ag NO$_3$ in distilled water to a total solution volume of 336 cm$^3$;
2. add solution to 350 gm (approx. 700 cm$^3$) support in a large (190 mm diameter) crystallizing dish; stir until all pellets are totally moistened with solution;
3. air dry pellets overnight in a shallow dish;
4. calcine in a 2 inch diameter quartz tube placed in a large tube furnace, with the air flow rate at 2 CFH (cubic foot per hour) using the following heating schedule:
   100° C.—3 hours
   250° C.—¾ hour
   350° C.—¾ hour
   500° C.—4 hours
5. dissolve 0.035 gm Pd(NH$_3$)$_4$(NO$_3$)$_2$ in distilled water to a total solution volume of 336 cm$^3$;
6. add solution to 700 cm$^3$ of Ag/Al$_2$O$_3$ catalyst (prepared in step 4) in a large crystallizing dish; stir until all pellets are totally moistened with the solution;
7. air dry pellets overnight in a shallow dish;
8. calcine as in step 4.

The success of our bimetallic catalyst system derives from the fact that palladium atoms are highly dispersed and in intimate contact with silver atoms. aggregated palladium particles must be avoided since the behavior characteristic of large palladium particles in producing undesirable byproducts of formaldehyde and methyl formate would be observed. Therefore, the silver-to-palladium atomic ratio must be very high and palladium must be uniformly impregnated throughout the alumina support. To achieve these objectives we used a silver-to-palladium atomic ratio of 500 to 1 and used the palladium tetrammine dinitrate as the precursor. We have found that palladium tetrammine dinitrate does not interact as strongly with alumina as other palladium salts, e.g., palladium chloride salt. This in turn leads to a more uniform palladium distribution throughout the surface layers of the pellets.

Due to the proportions of the active metals utilized in the special method of preparation, our bimetallic catalyst is more effective for the simultaneous oxidation of carbon monoxide and unburned methanol to carbon dioxide and water than either palladium catalyst alone or silver catalyst alone. To illustrate this, we compared oxidation data obtained in feed gases containing carbon monoxide alone, methanol alone, and mixtures of methanol and carbon monoxide. All three different feed gases were tested over the three catalyst systems, i.e., 0.01 wt % palladium/gamma alumina, 5 wt % silver/gamma alumina, and 0.01 wt % palladium - 5 wt % silver/gamma alumina catalysts.

Referring initially to FIG. 1 where carbon monoxide oxidation activities over three different catalyst systems are illustrated, the silver catalyst, when compared to the palladium catalyst, shows better low-temperture activity but worse high-temperature activity, with a crossover occurring near 460 degrees Kelvin. In comparison, the palladium/silver catalyst system retains the superior low-temperature activity of silver and part of the superior high-temperature activity of palladium. The feed gas used in these tests contains 0.2% carbon monoxide and 1% oxygen with the balance being helium gas.

Figure 2:
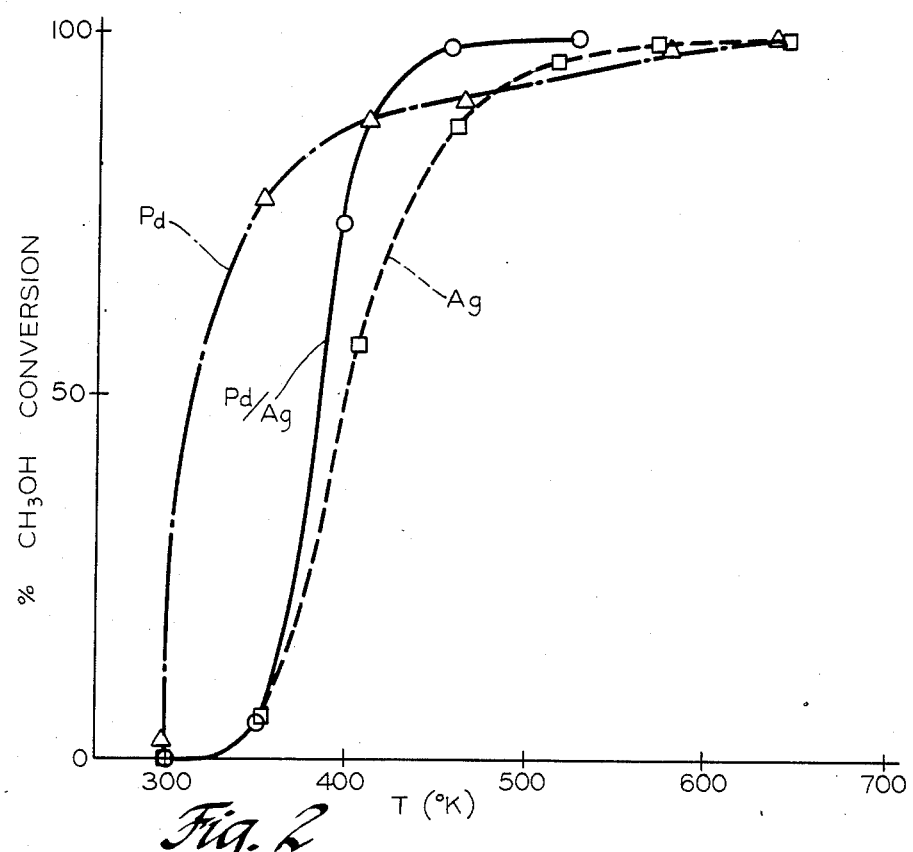
FIG. 2 is a graph showing the methanol oxidation activities of three gamma alumina-supported catalyst systems: silver alone, palladium alone, and the palladium/silver bimetallic catalyst system.
Figure 3:
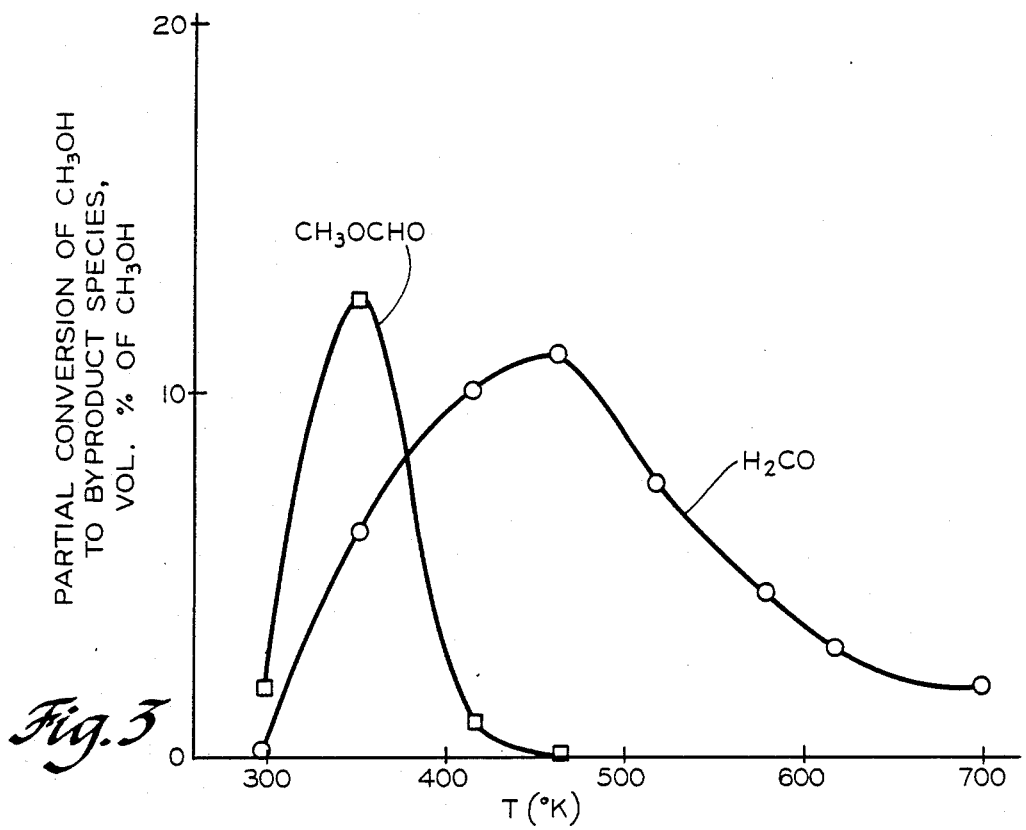
FIG. 3 is a graph showing the yields of partial oxidation products in methanol oxidation over a gamma alumina-supported palladium catalyst.

FIG. 2 is a graph showing comparative methanol oxidation activities over the three catalyst systems in the absence of carbon monoxide. The feed gas used in these tests contains 0.2% methanol, 1% oxygen, with the balance being helium gas. It is seen that palladium is much more active at low temperatures than silver, with the palladium/silver catalyst falling in between. Significantly, much of the low temperature activity of palladium is associated with the partial oxidation of methanol to methyl formate ($CH_3OCHO$) and formaldehyde ($H_2CO$). It is seen in FIG. 3 that as much as 12% methyl formate and 11% formaldehyde of the total volume of the feed methanol gas are formed over the palladium/gamma alumina catalyst. The formation of these by-products is undesirable since they contribute to hydrocarbon emission measurements. Particularly, the formation of formaldehyde is of concern for health and environmental reasons.

Our novel invention of using palladium/silver bimetallic catalyst is superior to the use of silver alone or palladium alone because the activity of our bimetallic catalyst is greater than that of silver alone, while its selectivity for complete oxidation of methanol to carbon dioxide and water is as good or better than silver alone. In other words, combining a small amount of palladium with silver increases the activity of silver catalyst without introducing the partial oxidation characteristics of palladium catalysts.

Figure 4:
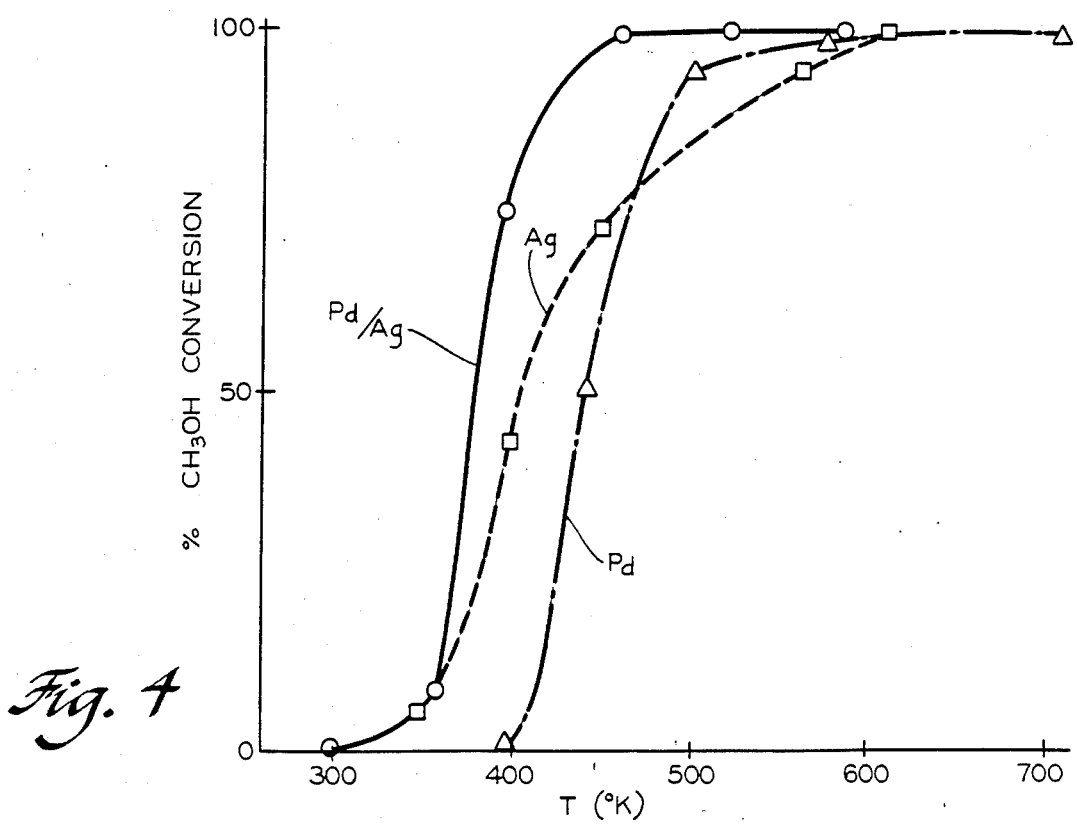
FIG. 4 is a graph showing the methanol oxidation activities in the presence of added carbon monoxide of three gamma alumina-supported catalyst systems: silver alone, palladium alone, and the palladium/silver bimetallic catalyst system.

The superiority of our palladium/silver bimetallic catalyst system over palladium or silver alone is best demonstrated in graphs contained in FIG. 4 where the methanol oxidation activity in the presence of added carbon monoxide by the three catalysts is shown. The superiority of the palladium/silver catalyst can be seen both in terms of temperatures required to reach a specific conversion level and also in the conversions obtained at particular temperatures. The feed gas used in these tests contained 0.2% methanol, 0.2% carbon monoxide, 1% oxygen with the balance being helium gas. This is the situation that is most representative of a methanol fueled vehicle exhaust, i.e., unburned methanol will always be present with carbon monoxide. It is seen in FIG. 4 that the palladium/silver bimetallic catalyst reaches the 50% methanol conversion level at 380 degrees Kelvin, 25° below the temperature at which the silver catalyst produces 50% methanol conversion (405 degrees Kelvin), and 60 degrees below the temperature at which the palladium catalyst produces 50% methanol conversion (440 degrees Kelvin). This is achieved while maintaining the yields of methyl formate and formaldehyde over the palladium/silver bimetallic catalyst below the limits of detection, i.e., smaller than 0.05 volume percent of the feed methanol gas.

The superiority of our palladium/silver bimetallic catalyst is even more pronounced at the 90% conversion level which is attained at 420 degrees Kelvin (FIG. 4) versus 490 degrees Kelvin for the palladium catalyst alone and 532 degrees Kelvin for the silver catalyst alone. The excellent low temperature activity of the palladium/silver catalyst is particularly beneficial in methanol fueled vehicle exhaust emission control. This is because methanol fueled vehicles are characterized by high emission rates of unburned fuel and carbon monoxide during the warm-up period of the engine and the catalytic converter. For instance, in a typical methanol-fueled passenger vehicle, nearly half of the total hydrocarbon emissions are generated during the cold-start portion (cycles 1-5) of the U.S. Federal Emissions Test Procedure (FTP), defined as that portion of the FTP during which the engine and catalytic converter reach steady-state operating temperatures. In addition, cycle 1 alone accounts for more than 25% of the total hydrocarbon emissions, thus significant reduction of hydrocarbon (i.e., unburned methanol fuel) can only be expected with catalysts that achieve high conversion levels at low temperatures.

The unique properties of simultaneously treating unburned methanol and carbon monoxide by our novel invention are obtained only when a proper palladium to silver proportion is used and a special preparation method is followed. It is known that unique catalytic properties can be imparted to metals by dispersing them in a finely divided state, i.e., particle diameters of 100 Angstrom or less, on high surface area metal oxide supports such as gamma alumina. A very different catalytic behavior for metals in their bulk state than those highly dispersed on high surface area metal oxide supports is observed. We believe that several factors can account for the unique catalytic behavior of such highly dispersed catalyst systems. First, electron transfer can occur between the metal and the alumina support which results in different electronic and, hence, catalytic properties of the dispersed metal when compared to the bulk metal. Secondly, highly dispersed metals are generally oxidized and reduced much more readily than bulk metals. Thirdly, highly dispersed metals such as our palladium/silver system often contain higher concentrations of defect sites or sites of low metal atom coordination than bulk metals. The combination of factors such as these contribute to the unique catalytic behavior of our palladium/silver bimetallic catalyst system. In our system, palladium represents only 0.2% of the total metal (palladium and silver) contained in our catalyst. Methanol is oxidized over this bimetallic catalyst system nearly exclusively to carbon dioxide and water without any appreciable amount of formaldehyde produced. In contrast, bulk palladium/silve alloy catalysts are known to produce significant amounts of formaldehyde during methanol oxidation. Currently existing literature involving palladium/silver cataltyst deal almost exclusively with bulk palladium/silver alloys.

We have demonstrated that although silver is not as active as palladium for methanol oxidation in the absence of carbon monoxide, silver is more active for methanol oxidation in the presence of carbon monoxide. On the other hand, silver is not as active for carbon monoxide oxidation as palladium, particularly at high temperatures. Combining palladium with silver leads to interactions that result in carbon monoxide and methanol oxidation activity that is superior to the activity of palladium or silver catalyst alone. Additionally, selectivity of the bimetallic catalyst for complete methanol oxidation to carbon dioxide and water is superior to that of palladium catalysts and as good or better than that of silver catalysts.

While a preferred embodiment of our novel invention has been illustrated and described, it will be obvious to those skilled in the art that various changes and modifications may be made without departing from the spirit of the invention. For instance, we believe other noble metals such as platinum and other base metals such as copper should work equally well as our preferred embodiment as long as the proper proportion and the special preparation technique taught by the present invention are used. A few examples of these bimetallic catalyst systems are Pt/Ag, Pt/Cu, Pd/Cu, etc. We also believe that a trimetallic catalyst system such as Pd/Ag/Cu dispersed on gamma alumina in which Pd is the major metal component, i.e., contents of both Ag and Cu are less than 1 wt %, should be equally effective in treating methanol in the presence of carbon monoxide at low conversion temperatures.

The embodiments of the invention in which an exclusive property or privilege is claimed are defined as follows:

1. A method of treating exhaust gases from an internal combustion engine burning methanol fuel by simultaneously oxidizing the unburned methanol and carbon monoxide contained in said exhaust gases, said method comprising the step of passing said exhaust gases over a catalyst system consisting essentially of 5 weight percent silver and 0.01 weight percent palladium dispersed on a substrate, whereby said palladium is finely dispersed in and in initimate contact with said silver to simultaneously oxidize unburned methanol and carbon monoxide into carbon dioxide and water.

* * * * *